United States Patent
Bandara et al.

(10) Patent No.: US 11,568,460 B2
(45) Date of Patent: Jan. 31, 2023

(54) DEVICE, METHOD, AND PROGRAM FOR COMMERCIAL PRODUCT RELIABILITY EVALUATION BASED ON IMAGE COMPARISON

(71) Applicant: Rakuten Group, Inc., Tokyo (JP)

(72) Inventors: Udana Bandara, Setagaya-ku (JP); Soh Masuko, Setagaya-ku (JP)

(73) Assignee: Rakuten Group, Inc., Tokyo (JP)

( * ) Notice: Subject to any disclaimer, the term of this patent is extended or adjusted under 35 U.S.C. 154(b) by 1176 days.

(21) Appl. No.: 15/036,079

(22) PCT Filed: Mar. 31, 2014

(86) PCT No.: PCT/JP2014/059511
§ 371 (c)(1),
(2) Date: May 12, 2016

(87) PCT Pub. No.: WO2015/151182
PCT Pub. Date: Oct. 8, 2015

(65) Prior Publication Data
US 2016/0292757 A1    Oct. 6, 2016

(51) Int. Cl.
*G06Q 30/06* (2012.01)
*G06Q 30/02* (2012.01)

(52) U.S. Cl.
CPC ..... *G06Q 30/0609* (2013.01); *G06Q 30/0278* (2013.01); *G06Q 30/06* (2013.01); *G06Q 30/0643* (2013.01)

(58) Field of Classification Search
CPC ............ G06Q 30/06; G06Q 30/0609
(Continued)

(56) References Cited

U.S. PATENT DOCUMENTS

2004/0148260 A1    7/2004 Matsuda et al.
2005/0137882 A1    6/2005 Cameron et al.
(Continued)

FOREIGN PATENT DOCUMENTS

JP    2002-109261 A    4/2002
JP    2004-213629 A    7/2004
(Continued)

OTHER PUBLICATIONS

Peng, L., Wong, A. H. K., & Wan, L. C. (2012). The effects of image congruence and self-monitoring on product evaluations: A comparison between genuine and counterfeit products. Journal of Global Marketing, 25(1), 17. Retrieved from https://dialog.proquest.com/professional/docview/1026559358?accountid=131444.*

(Continued)

*Primary Examiner* — Jeffrey A. Smith
*Assistant Examiner* — Jennifer V Lee
(74) *Attorney, Agent, or Firm* — Sughrue Mion, PLLC

(57) ABSTRACT

A product evaluation device includes a receiving means for receiving product specifying information for specifying a product attribute, an acquisition means for acquiring designation in formation corresponding to a product attribute specified by the product specifying information from a storage means storing, for each product attribute, a genuine image showing a characteristic part for evaluating whether a product is a genuine product and designation information designating the characteristic part in association with each other, a request means for requesting a user to take a photograph by designating a characteristic part of the product based on the designation information acquired from the storage means and requesting a photographed image obtained by the photographing, and an output means for outputting an evaluation result obtained based on the pho- (Continued)

tographed image provided in response to the request and the genuine image stored in the storage means.

7 Claims, 14 Drawing Sheets

(58) Field of Classification Search
USPC .............................................. 705/26.1–27.2
See application file for complete search history.

(56) References Cited

U.S. PATENT DOCUMENTS

| | | | |
|---|---|---|---|
| 2009/0089175 A1 | 4/2009 | Platek et al. | |
| 2012/0027305 A1* | 2/2012 | Kim | G06K 9/00664 |
| | | | 382/195 |
| 2012/0066203 A1* | 3/2012 | Robert | G06F 16/951 |
| | | | 707/711 |
| 2014/0143090 A1* | 5/2014 | Deyle | G06Q 10/0833 |
| | | | 705/26.35 |
| 2014/0279613 A1* | 9/2014 | Lee | G06Q 30/0185 |
| | | | 705/318 |
| 2014/0337105 A1 | 11/2014 | Platek et al. | |
| 2017/0161810 A1* | 6/2017 | Nair | G06Q 30/018 |

FOREIGN PATENT DOCUMENTS

| | | |
|---|---|---|
| JP | 2005-196259 A | 7/2005 |
| JP | 2007-206992 A | 8/2007 |
| JP | 2009-266082 A | 11/2009 |
| WO | 2009/044826 A1 | 4/2009 |

OTHER PUBLICATIONS

International Search Report for PCT/JP2014/059511 dated Jul. 1, 2014.

* cited by examiner

*Fig.4*

| PRODUCT SPECIFYING INFORMATION | DESIGNATION INFORMATION | GENUINE IMAGE |
|---|---|---|
| A1 | I1 | F1 |
| A2 | I2 | F2 |
| A3 | I3 | F3 |
| A4 | I4 | F4 |
| ⋮ | ⋮ | ⋮ |

| PRODUCT ID | RELIABILITY |
|---|---|
| M1 | 90% |

*Fig.9*

| PRODUCT ID | PRICE | USER ID | ····· | RELIABILITY |
|---|---|---|---|---|
| M1 | N1 | U01 | ····· | 90% |
| M2 | N2 | U02 | ····· | 95% |
| M3 | N3 | U03 | ····· | 50% |
| M4 | N4 | U04 | ····· | 75% |
| ⋮ | ⋮ | ⋮ | ⋮ | ⋮ |

| PRODUCT ID | PRICE | USER ID | ... | RELIABILITY | PHOTOGRAPHED IMAGE |
|---|---|---|---|---|---|
| M1 | N1 | U01 | ...... | 90% | B1 |
| M2 | N2 | U02 | ...... | 95% | B2 |
| M3 | N3 | U03 | ...... | 50% | B3 |
| M4 | N4 | U04 | ...... | 75% | B4 |
| ... | ... | ... | ... | ... | ... |

DEVICE, METHOD, AND PROGRAM FOR COMMERCIAL PRODUCT RELIABILITY EVALUATION BASED ON IMAGE COMPARISON

CROSS REFERENCE TO RELATED APPLICATIONS

This application is a National Stage of International Application No. PCT/JP2014/059511 filed Mar. 31, 2014, the contents of all of which are incorporated herein by reference in their entirety.

TECHNICAL FIELD

One aspect of the present invention relates to a commercial product evaluation device, method, and program.

BACKGROUND ART

Auctions on the Internet are widespread today (for example, see Patent Literature 1). In Internet auctions, a seller uploads product information including a photographed image or the like to an auction site. Then, a person who wishes to purchase the product refers to the uploaded product information and considers whether or not to make a bid.

CITATION LIST

Patent Literature

PTL 1: Japanese Unexamined Patent Publication No. 2007-206992

SUMMARY OF INVENTION

Technical Problem

Various products are traded on Internet auction sites. Products for trade include products from brands (brand-name products). In the trade of brand-name products, there is a possibility that fake items are placed on an auction market or sold through it. It is difficult for a person who wishes to purchase a product to determine whether the product is genuine or fake from the image of the product. This problem is not limited to Internet auctions but is a general issue in Internet commerce (electronic commerce). Further, an administrator of an electronic commerce site desires to prevent the trade of false products. Furthermore, there is a case where false products are sold in real stores. In some cases, a person who wishes to purchase a product is difficult to determine whether the product is genuine or fake even when he/she sees the real product.

In light of the above, an object of one aspect of the present invention is to reduce the cases where a fake product is registered as a product for trade.

Solution to Problem

To solve the above problem, a product evaluation device according to one aspect of the present invention includes a receiving means for receiving product specifying information for specifying product attribute, an acquisition means for acquiring designation information corresponding to a product attribute specified by the product specifying information from a storage means storing, for each product attribute, a genuine image showing a characteristic part for evaluating whether a product is a genuine product and designation information designating the characteristic part in association with each other, a request means for requesting a user to take a photograph by designating a characteristic part of the product based on the designation information acquired from the storage means and requesting a photographed image obtained by the photographing, and an output means for outputting an evaluation result obtained based on the photographed image provided in response to the request and the genuine image stored in the storage means.

A product evaluation method according to one aspect of the present invention is a product evaluation method to be executed by a computer, the method including a receiving step of receiving product specifying information for specifying a product attribute, an acquisition step of acquiring designation information corresponding to a product attribute specified by the product specifying information from a storage means storing, for each product attribute, a genuine image showing a characteristic part for evaluating whether a product is a genuine product and designation information designating the characteristic part in association with each other, a request step of requesting a user to take a photograph by designating a characteristic part of the product based on the designation information acquired from the storage means and requesting a photographed image obtained by the photographing, and an output step of outputting an evaluation result obtained based on the photographed image provided in response to the request and the genuine image stored in the storage means.

A product evaluation program according to one aspect of the present invention causes a computer to implement a receiving function that receives product specifying information for specifying a product attribute, an acquisition function that acquires designation information corresponding to a product attribute specified by the product specifying information from a storage means storing, for each product attribute, a genuine image showing a characteristic part for evaluating Whether a product is a genuine product and designation information designating the characteristic part in association with each other, a request function that requests a user to take a photograph by designating a characteristic part of the product based on the designation information acquired from the storage means and requests a photographed image obtained by the photographing, and an output function that outputs an evaluation result obtained based on the photographed image provided in response to the request and the genuine image stored in the storage means.

According to the above aspects, a request for taking photograph of a characteristic part of a product is made to a user, a photographed image that is taken by the user in response to the request is acquired, and an evaluation result based on the photographed image and a genuine image is output. In other words, a request for taking a photograph of a characteristic part which allows discrimination between a genuine item and a fake item is made to a user, and an evaluation result is recognized by a user, and it is thereby possible to suppress the possibility that a fake item is registered as a product for trade.

In the product evaluation device according to another aspect, the output means may display the evaluation result on a product page showing a product for trade of the product.

According to this aspect, because an evaluation result is displayed on a product page of the product, a user who views the product page can determine the probability that the product is a genuine product.

The product evaluation device according to another aspect may further include an evaluation means for calculating reliability as an evaluation result based on similarity between a genuine image showing a characteristic part of a genuine product specified by the product specifying information and the photographed image, and the output means may output an evaluation result by the evaluation means.

According to this aspect, because reliability of a photographed image determined based on similarity with a genuine image is output as an evaluation result, it is possible to determine the probability that the product is a genuine product based on the evaluation result. This prevents a fake item from being registered as a product for trade.

In the product evaluation device according to another aspect, in response to a request for presenting product information, the output means may output a plurality of product information so that product information with higher reliability is displayed preferentially.

According to this aspect, when presenting product information in response to a request for presentation, the product information of a product that is likely to be fake is less likely to be displayed.

In the product evaluation device according to another aspect, the output means may perform control so that product information corresponding to a photographed image where the reliability is less than a specified value is not registered in a product information storage means for storing product information related to a product for trade of the product.

According to this aspect, it is prevented that a product that is likely to be fake is registered as a product for trade.

In the product evaluation device according to another aspect, the evaluation means may extract, as supplementary product information, product specifying information associated with a genuine image having similarity of a specified value or more to the photographed image by referring to a storage means storing a plurality of characteristic information where the designation information and the genuine image are associated with the product specifying information, and the output means may output an evaluation result containing the supplementary product information.

According to this aspect, because information with higher likelihood is output as information that specifies a product shown in a photographed image, it is possible to determine the probability that the product is a genuine product.

In the product evaluation device according to another aspect, a plurality of photographed images may be provided for one product in response to the request, and position information indicating a place where a photograph is taken may he associated with each of the photographed images, and the evaluation means may calculate reliability based on a difference between a plurality of position information corresponding to the plurality of photographed images provided for one product.

In the case where the position information associated with each of a plurality of photographed images is different from each other, there is a possibility that at least any one of the acquired photographed images is not an image of a product for trade. According to the above aspect, the reliability of the product is calculated to be lower in such a case, and it is possible to prevent that a product that is likely to he fake is registered as a product for trade.

In the product evaluation device according to another aspect, when the photographed image is the same as a photographed image of another product acquired from the user, the evaluation means may calculate reliability to be lower than When the images are not the same.

In the case where a photographed image acquired from a user as a photographed image of a product for trade is the same as a photographed image of another product acquired from the same user, there is a possibility that the acquired photographed image is not an image of a product for trade. According to the above aspect, the reliability of the product is calculated to be lower in such a case, and it is possible to prevent that a product that is likely to be fake is registered as a product for trade.

In the product evaluation device according to another aspect, when similarity between a region where a characteristic part of a product is shown in the photographed image and a region where the characteristic part is shown in the genuine image is a specified value or higher, the evaluation means may calculate reliability based on similarity between a region other than the region where the characteristic part of the product is shown in the photographed image and a region other than the region where the characteristic part is shown in the genuine image and similarity of the region of the characteristic part.

According to this aspect, even when a photographed image of a non-genuine product to which a characteristic part having been detached from a genuine product is attached is transmitted from a user, the similarity other than the characteristic part is used for the evaluation, and the reliability can be evaluated appropriately.

In the product evaluation device according to another aspect, the designation information may be a guide image for specifying a characteristic part of a product.

According to this aspect, a characteristic part of a product is visually recognizable, which allows a user to easily take a photographed image.

The product evaluation device according to another aspect may further include a generation means for generating the guide image based on the genuine image corresponding to a product attribute specified by the product specifying information.

According to this aspect, it is possible to easily prepare a guide image to be output to a user.

Advantageous Effects of Invention

According to one aspect of the present invention, it is possible to reduce the cases where a fake product is registered as a product for trade.

BRIEF DESCRIPTION OF DRAWINGS

FIG. 4 is a view schematically showing a configuration of a characteristic information storage unit and an example of data stored therein.

FIG. 7 is a view showing one example of an evaluation result output from an output unit.

FIG. 9 is a view schematically showing a configuration of a product information storage unit and an example of data stored therein.

FIG. 12 is a view showing a configuration of a product information storage unit storing photographed images and an example of data stored therein.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
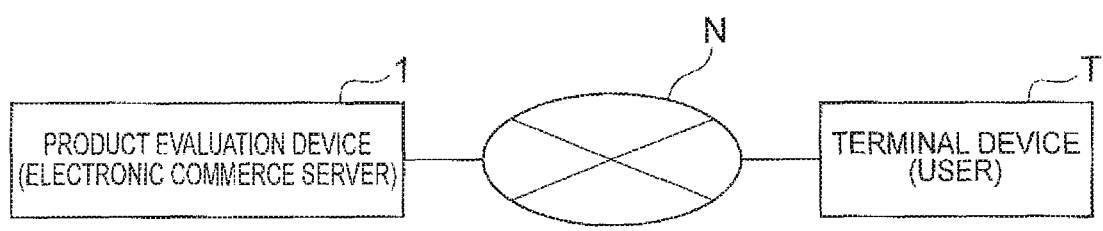
FIG. 1 is a view showing a system that includes a product evaluation device according to an embodiment.

FIG. 1 is a view showing a system that includes a product evaluation device according to this embodiment. A product evaluation device 1 is implemented in an electronic commerce server that runs an electronic commerce site, for example. The product evaluation device 1 can communicate with a user's terminal, device T through a network. A user of the terminal device T is a store that sells products on the electronic commerce site, for example.

Further, the product evaluation device 1 may be implemented in a server that runs an auction site. In this case, a user of the terminal device T is a seller on an auction, for example.

Furthermore, the product evaluation device 1 may be implemented in a server different from a server that runs an electronic commerce site or an auction site.

Figure 2:
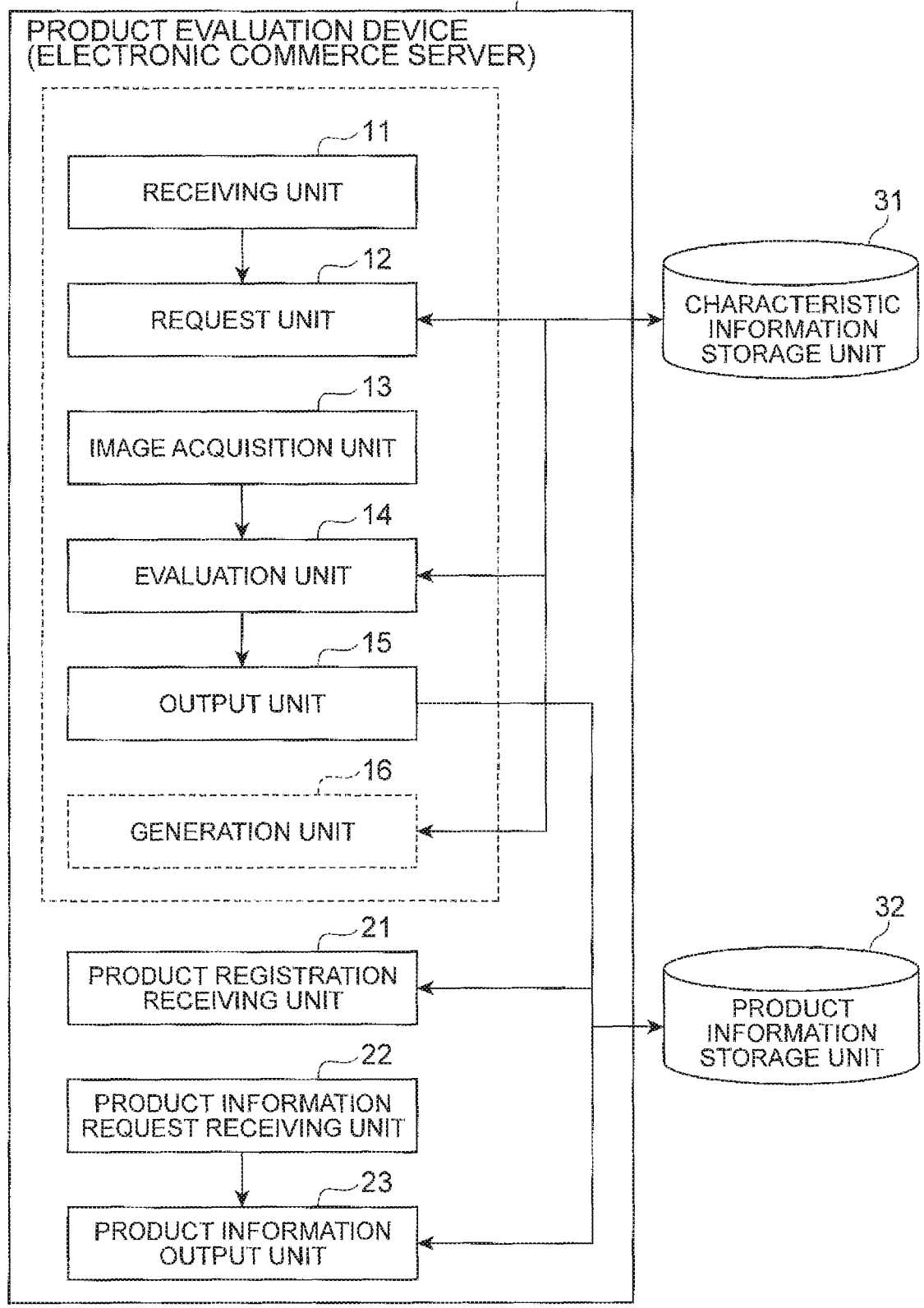
FIG. 2 is a block diagram showing a functional configuration of the product evaluation device.

FIG. 2 is a block diagram showing a functional configuration of the product evaluation device 1 according to this embodiment. The product evaluation device 1 according to this embodiment is implemented in an electronic commerce server. The electronic commerce server receives registration of product information about a product for trade from a store and presents the product information in response to a request for presenting the product information from a user who wishes to purchase the product. Further, the electronic commerce server can perform payment processing or the like related to the trade of a product.

As shown, in FIG. 2, the product evaluation device 1 according to this embodiment functionally includes a receiving unit 11 (receiving means), a request unit 12 (acquisition means, request means), an image acquisition unit 13, an evaluation unit 14 (evaluation means), and an output unit 115 (output means). The product evaluation device 1 may further include a generation unit 16 (generation means). Further, the product evaluation device 1 may include a product registration receiving unit 21, a product information request receiving unit 22, and a product information output unit 23 (output means) as functions of an electronic commerce site. The functional units of the product evaluation device 1 can access storage means such as a characteristic information storage unit 31 (characteristic information storage means) and a product information storage unit 32 (product information storage means). Note that, although the characteristic information storage unit 31 and the product information storage unit 32 are placed in another device that is connected to the product evaluation device 1 via a network, they may be included in the product evaluation device 1.

Figure 3:
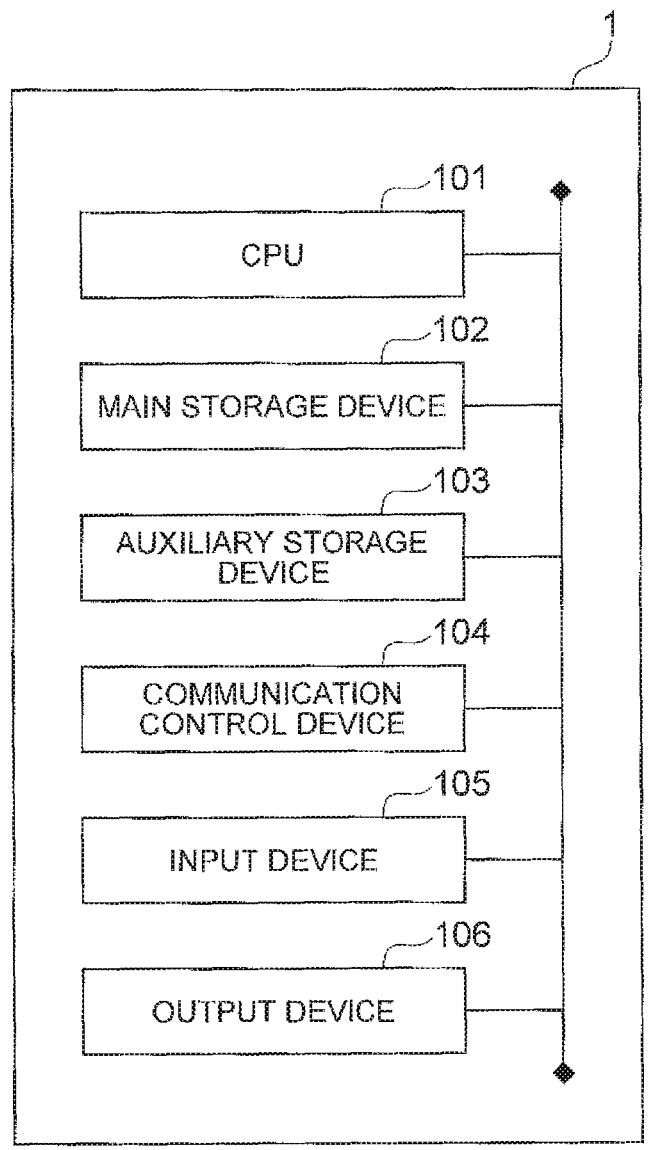
FIG. 3 is a view showing a hardware configuration of the product evaluation device.

FIG. 3 is a view showing a hardware configuration of the product evaluation device 1. As shown in FIG. 3, the product evaluation device 1 is physically configured as a computer system that includes a CPU 101, a main storage device 102 such, as memory like RAM and ROM, an auxiliary storage device 103 such as a hard disk, a communication control device 104 such as a network card, an input device 105 such as a keyboard and a mouse, an output device 106 such as a display and the like.

The functions shown in FIG. 2 are implemented by loading given computer software (product evaluation program) onto hardware such as the CPU 101 or the main storage device 102 shown in FIG. 3, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

The functional units of the product evaluation device 1 are described hereinafter. Prior to describing the functional units 11 to 16, the functional units 21 to 23 and the product information storage unit 32 for constructing an electronic commerce site are described. The product registration receiving unit 21 is a part that receives registration of product information of a product for trade from the terminal device T of a user (store). The product information contains information such as a product name, a product attribute, a price, a product image and the like. The product registration receiving unit 21 stores the received product information into the product information storage unit 32. The product information storage unit 32 is a storage means for storing product information of products for trade.

The product information request receiving unit 22 is a part that receives a request for presenting product information from the terminal device of a user who is thinking about purchasing a product. Specifically, the product information request receiving unit 22 can receive a request containing designation of a product name. Further, the product information request receiving unit 22 may receive a search request containing designation of a product attribute.

The product information output unit 23 is a part that, in response to a request for presenting product information received by the product information request receiving unit 22, outputs the product information to the terminal device that has made the request. For example, when a request containing designation of a product name is received, the product information output unit 23 extracts the product information of the designated product name from the product information storage unit 32 and transmits the extracted product information to the terminal device that has made the request. Further, when a search request containing designation of a product attribute or a character string being a part of a product name as search criteria is received, the product information output unit 23 extracts the product information that matches the search criteria from the product information storage unit 32 and transmits the extracted product information to the terminal device that has made the request.

The functional units 11 to 16 of the product evaluation device 1 are described hereinafter. The receiving unit 11 is a part that receives product specifying information that can specify a product attribute. Specifically, for example, the receiving unit 11 receives the product specifying information of a product to be registered as a product for trade from the terminal device of a user (store). In this embodiment, the product attribute is information for specifying the corresponding designation information (which is described later), and it is information such as a product itself, a genre name, a brand name or a brand series name. Note that, as the information indicating a product itself, a product name or a product ID may be used. The product specifying information is a product name, a product ID, a genre name, a brand name, a name of a product series, an era, a product image and the like, for example. Note that in this embodiment, when registration of the product information is received by the product registration receiving unit 21, the receiving unit 11 may receive the product specifying information in link with the registration.

The request unit 12 is a part that acquires designation information corresponding to a product attribute specified by the product specifying information from the characteristic information storage unit 31 that stores a genuine image showing a characteristic part for evaluating whether it is a genuine product for each product attribute and designation information that designates the characteristic part in association with each, other. Further, the request unit 12 is a part that designates a characteristic part of a product based on the designation information acquired from the characteristic information storage unit 31 and requests a user to take a photograph and requests a photographed image obtained by the photographing. The characteristic part of a product is a part by which the product can be distinguished from another product, and there may be a plurality of characteristic parts for one product. Specificaly, for example, the request unit 12 extracts the designation information corresponding to the product specifying information received by the receiving unit 11 by referring to the characteristic information storage unit 31. Then, the request unit 12 transmits the extracted designation information to the terminal device T of the user and thereby requests the user to take a photograph (photographed image) showing the characteristic part designated by the designation information.

To be more specific, the request unit 12 specifies a product attribute corresponding to the product specifying information received by the receiving unit 11. For example, when a product name is received as the product specifying information, the request unit 12 specifies the same product name, or a corresponding genre name, brand name or a series name, from a plurality of product attributes stored in the characteristic information storage unit 31. To specify the corresponding genre name or the like, data in which product names and genre names are associated, which is separately prepared, is used.

The characteristic information storage unit 31 is a storage means for storing designation information, and a genuine image in association with product specifying information. FIG. 4 is a view schematically showing a configuration of the characteristic information storage unit 31 and an example of data stored therein. As shown in FIG. 4, the characteristic information storage unit 31 stores designation information I1 and a genuine image F1 in association with product specifying information A1.

The designation information may be text information indicating a characteristic part of a product or an image showing a characteristic part, for example. The image showing a characteristic part may be the same as the genuine image. Further, the designation information may be a guide image that can specify a characteristic part. The guide image is an image schematically showing the shape or the position of a characteristic part, and it may be an image showing the outline of a characteristic part, for example. Further, the guide image may contain text which is a message that prompts a user to take a photograph of a characteristic part. By sending such a guide image to a user, the user can visually recognize a characteristic part of a product, which allows the user to easily take a photographed image.

Figure 5:
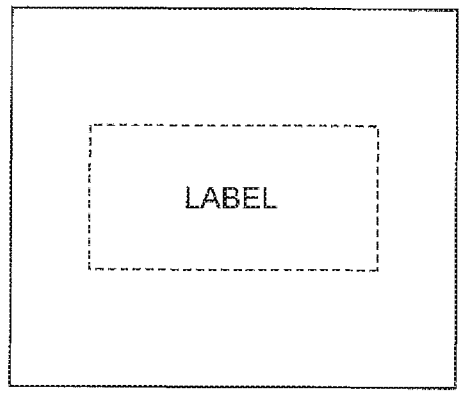
FIG. 5 is a view showing examples of a guide image.
Figure 5:
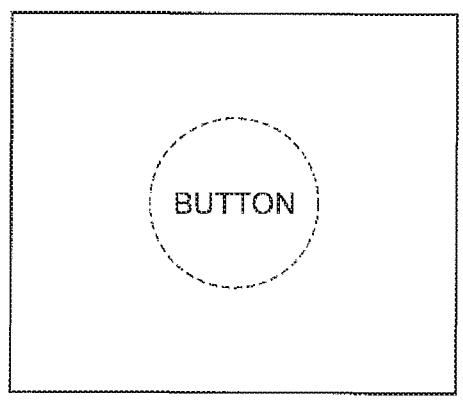
Figure 5:
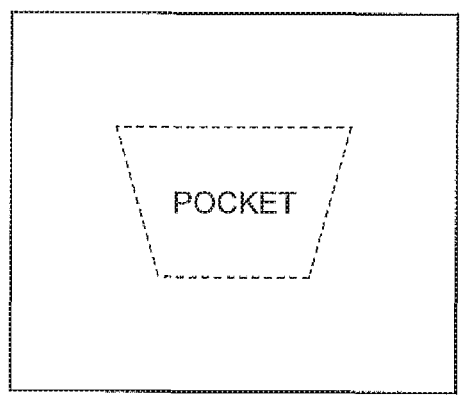

FIG. 5 is a view showing examples of a guide image. The guide image Shown in FIG. 5(*a*) schematically shows a label and a part in which the label is placed, where the shape of the label is represented by the dotted line. The guide image may be an image showing the corner positions of the label shape. Note that the guide image may be prestored in the characteristic information storage unit 31 or generated from a genuine image as described later. The guide image shown in FIG. 5(*b*) schematically shows a button and a part in which the button is placed, where the shape of the button is represented by the dotted line. Further, the guide image shown in FIG. 5(*c*) schematically shows a pocket and a part in which the pocket is placed, where the shape of the pocket is represented by the dotted line.

The genuine image is an image that shows a characteristic part of a genuine product of a product specified by the product specifying information. The genuine image is an image that is referred to for calculating the reliability of a photographed image that is acquired from the terminal T of a user who has responded to a request, as described later, and it is used for the calculation of the similarity to the photographed image. For example, in a product such as jeans, parts such as a pocket, a label and a stitch are characteristic for each brand, and it serves as a key to distinguish whether it is a genuine product or not. Thus, those parts can be used as characteristic parts.

Figure 6:
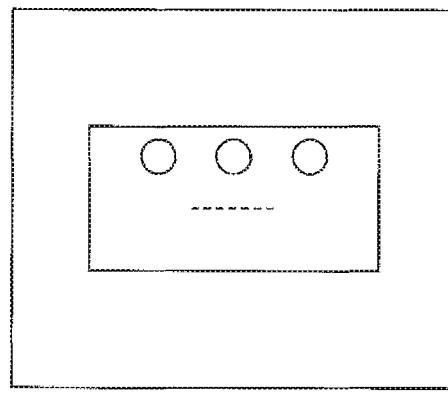
FIG. 6 is a view schematically showing an example of a genuine image.
Figure 6:
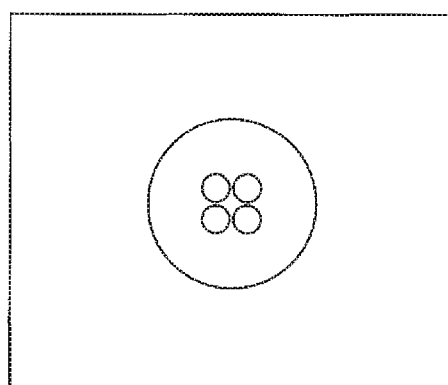
Figure 6:
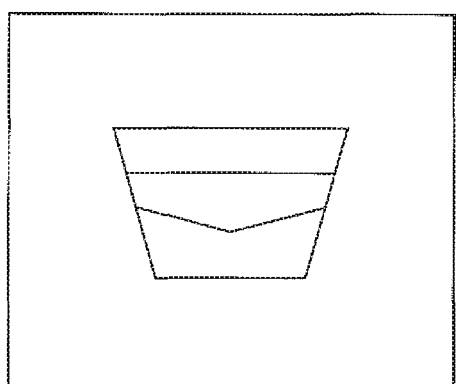

FIG. 6 is a view schematically showing examples of a genuine image. The genuine images shown in FIGS. 6(*a*) to 6(*c*) correspond to the guide images shown in FIGS. 5(*a*) to 5(*c*), respectively. Specifically, the genuine image shown in FIG. 6(*a*) is an image of a label and a part in which the label is placed on a genuine product of a product specified by the product specifying information associated in the characteristic information storage unit 31 (FIG. 4). Further, the genuine image shown in FIG. 6(*b*) is an image of a button and a part in which the button is placed on a genuine product of a product specified by the product specifying information associated in the characteristic information storage unit 31. The genuine image shown in FIG. 6(*c*) is an image of a pocket and a part in which the pocket is placed on a genuine product of a product specified by the product specifying information associated in the characteristic information storage unit 31. Note that the genuine images are prestored in the characteristic information storage unit 31, and they may be provided from the manufacturer of the product or the like, for example.

The image acquisition unit 13 is a part that acquires a photographed image taken by a user in response to a request from the request unit 12. Specifically, a user takes a photographed image, which is an image of a characteristic part of a product to be registered as a product for trade, based on designation information by using the terminal device T. Relating to this photographing, the terminal device T may have a configuration that displays a guide image superimposed on an image in a viewfinder indicating a position to be photographed. This allows a user to take a photographed image easily. Then, when the photographed image taken in the terminal device T is transmitted to the product evaluation device 1, the image acquisition unit 13 acquires the photographed image transmitted from the terminal device T. Thus, the photographed image is an image obtained by a user by taking an image of a characteristic part designated by the designation information and transmitted to the product evaluation device 1.

The evaluation unit 14 is a part that calculates the reliability based on the similarity between a genuine image showing a characteristic part of a genuine product of a product specified by the product specifying information and a photographed image acquired by the image acquisition unit 13. The reliability is higher as the similarity of the photographed image to the genuine image is higher, and it is a value indicating the likelihood that the product shown in the photographed image is a genuine product. The evaluation unit 14 can evaluate the similarity between a photographed image and a genuine image by known image processing technology.

Note that, when the similarity between a region in which a characteristic part of a product is shown in a photographed image and a region in which the characteristic part is shown in a genuine image is a specified value or higher, the evaluation unit 14 may calculate the reliability based on the similarity between a region other than the region in which the characteristic part of the product is shown in the photographed image and a region other than the region in which the characteristic part is shown in the genuine image and the similarity of the region of the characteristic part. Thus, even when a photographed image of a non-genuine product to which a characteristic part such as a label or a button having been detached from a genuine product is attached is transmitted from a user, the similarity other than the characteristic part (for example, cloth) is used for the evaluation, and the reliability can be evaluated appropriately.

Figure 7:
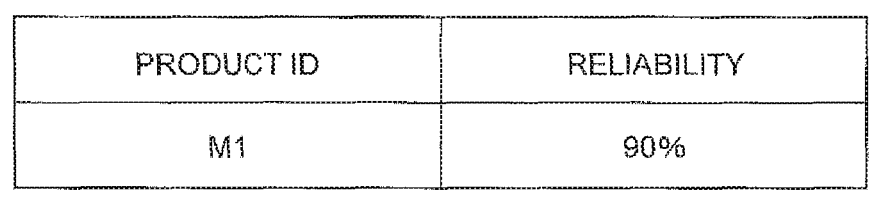

The output unit 15 is a part that outputs an evaluation result evaluated by the evaluation unit 14. In this embodiment, the reliability is output as one example of the evaluation result. FIG. 7 is a view showing one example of an evaluation result output from the output unit 15. As shown in FIG. 7, the evaluation result contains information such as the reliability "90%" associated with the product ID "M1". The product ID is information that is added when a request for registration of a product from the terminal device T of a user is received by the product registration receiving unit 21, for example, to identify the product. It is thereby possible to determine the probability that the product is a genuine product based on the evaluation result. This reduces the cases where a fake product is registered as a product for trade. The output of an evaluation result is specifically described below.

The output unit 15 can notify a user of an evaluation result. Specifically, the output unit 15 transmits an evaluation result containing the reliability to the terminal device T of a user. This enables the user to determine the probability that a product shown in a photographed image is a genuine product. Further, the output unit 15 may display an evaluation result on a display means (one example of an output device 106) included in the product evaluation device 1.

Figure 8:
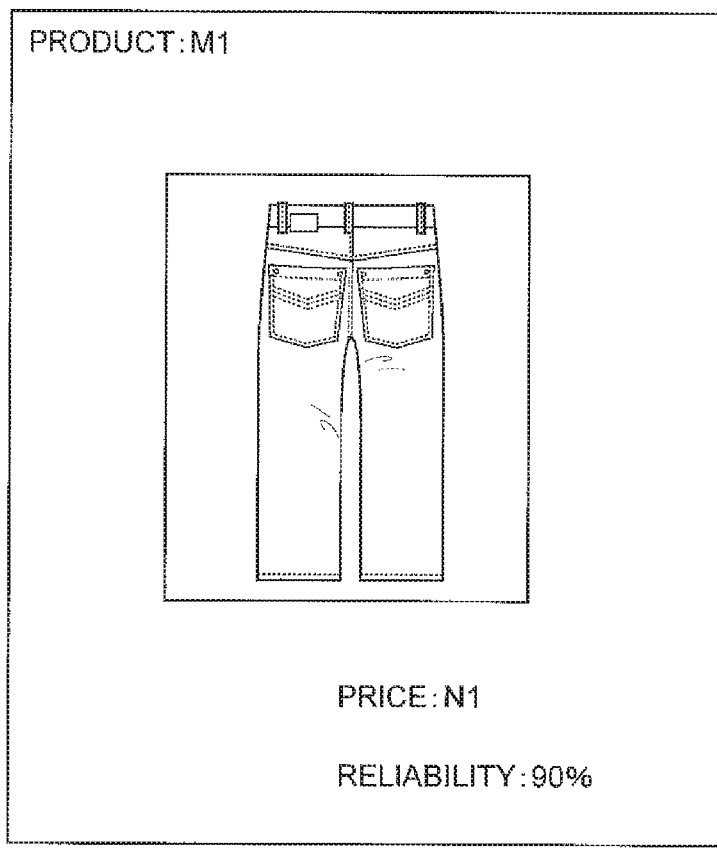
FIG. 8 is a view showing one example of a product page showing reliability.

Further, the output unit 15 may display an evaluation result on a product page in which a product is displayed for trading of the product. To be specific, the output unit 15 displays the reliability contained in an evaluation result on a product page that is output from the product information output unit 23 in response to a request from the user terminal of a user who is thinking about purchasing a product so as to present information about the product to the user, for example. FIG. 8 is a view showing one example of a product page on which the reliability is displayed. The product page shown in FIG. 8 is a page for presenting information about a product (jeans) with the product ID "M1" to a user and contains display such as "reliability 90%" indicating the reliability.

Further, the output unit 15 may store an evaluation result in association with the corresponding product in the product information storage unit 32. FIG. 9 is a view schematically showing a configuration of the product information storage unit 32 and an example of data stored therein. The product information storage unit 32 is a storage means for storing product information of products for trade as described earlier, and it stores a product ID that identifies a product in association with a price and other attribute information. Then, as shown in FIG. 9, the output unit 15 can store the reliability evaluated by the evaluation unit 14 in association with each product ID. For example, data indicating the reliability "90%" is associated with the product ID "M1", and data indicating the reliability "95%" is associated with the product ID "M2". In this manner, by associating the reliability with product information, when the product information output unit 23 outputs the product information in response to a request from a user who is thinking about purchasing a product, it is possible to reflect the reliability on the way of presenting the product information.

For example, the product information output unit 23 may output the product information of a product where the reliability is a specified value or more. Specifically, the product information output unit 23 may extract, from the product information storage unit 32, the product information corresponding to a request for presenting product information from a terminal device and transmits, to the terminal device that has made the request, the product information with which the reliability of a specified value or more is associated among the extracted product information. This prevents the presentation of the product information of a product that is likely to be fake.

Further, when presenting a plurality of product information, the product information output unit 23 may output them so that product information with higher reliability is displayed preferentially. Specifically, when a search request that specifies search criteria is received from a terminal device, the product information output unit 23 extracts the product information that matches the search criteria from the product information storage unit 32, and sorts the extracted plurality of product information in descending order of reliability and transmits them to the terminal device that has made the request. This allows the product information of a product that is likely to be fake to be less likely to be displayed.

Further, the output unit 15 may perform control so that the product information corresponding to a photographed image where the reliability is less than a specified value is not stored in the product information storage unit 32. Specifically, even when the product registration receiving unit 21 receives registration of product information to register a certain product as a product for trade from the terminal device T of a user, if the reliability evaluated by the evaluation unit 14 for the photographed image of this product is less than a specified value, the output unit 15 performs control so that the product information of this product is not registered and stored in the product information storage unit 32. This prevents the registration of the product information of a product that is likely to be fake in the product information storage unit 32, and it is thereby possible to avoid that a product likely to be fake is registered as a product for trade.

Further, the output unit 15 can output supplementary product information to be associated as attribute information with a product for which registration of product information is received by the product registration receiving unit 21 so as to be registered as a product for trade. Specifically, the evaluation unit 14 first extracts, as supplementary product information, the product specifying information associated with a genuine image having the similarity of a specified value or more to the photographed image acquired by the image acquisition unit 13 by referring to the characteristic information storage unit 31. Then, the output unit 15 outputs the extracted supplementary product information.

The output of the supplementary product information is specifically described with reference to FIG. 4. When it is assumed that product specifying information A2 that specifies a product to be registered as a product for trade is received by the receiving unit 11, for example, the request unit 12 transmits designation information I2 that is associated with the product specifying information A2 to the terminal device T and requests a user to take a photographed image. When the image acquisition unit 13 acquires a photographed image B that is transmitted from the terminal device T in response to the request, the evaluation unit 14 evaluates the similarity between a genuine image F2 that is associated with the product specifying information A2 and the photographed image B. Further, the evaluation unit 14 evaluates the similarity between another genuine image stored in the characteristic information storage unit 31 and the photographed image B. For example, when the similarity between the photographed image B and a genuine image F3 is higher than the similarity between the photographed image B and the genuine image F2 and is equal to or more than a specified value, the evaluation unit 14 extracts product specifying information A3 that is associated with, the genuine image F3. Then, the output unit 15 outputs the attribute information contained in the product specifying information A3 as the supplementary product information. An example of the output of the supplementary product information may be transmission to the terminal device T for presentation to a user or registration as the attribute information of the product in the product information storage unit 32. As a result, information with higher likelihood is output as the information that specifies the product shown in the photographed image, and it is possible to determine the probability that the product is a genuine product.

Figure 10:
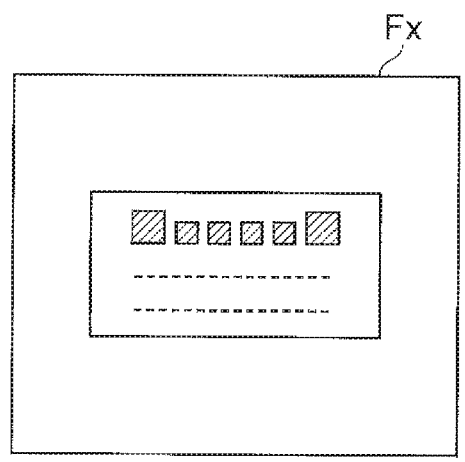
FIG. 10 is a view illustrating generation of a guide image.
Figure 10:
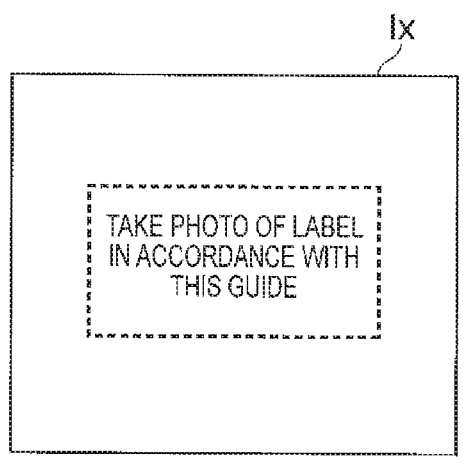

Referring back to FIG. 2, the generation unit 16 is a part that generates a guide image based on a genuine image showing a characteristic part of a genuine product. The generation of a guide image is described with reference to FIG. 10. FIG. 10(*a*) is a genuine image $F_X$ showing a label and its vicinity attached to a genuine product of a certain product. The generation unit 16 generates a guide image $I_X$ as shown in FIG. 10(*b*) based on the genuine image $F_X$. The generation of a guide image can be achieved by known image processing technology, and the guide image $I_X$ can be generated by extracting the outline of the label by detection of the edges or the corners of the genuine image $F_X$. It is thereby possible to easily prepare a guide image as the designation information to be output to a user.

Figure 11:
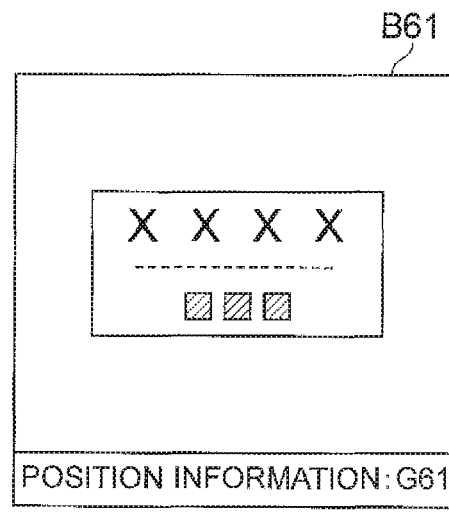
FIG. 11 is a view showing an example of a plurality of photographed images transmitted from a terminal device for evaluation of reliability on one product.
Figure 11:
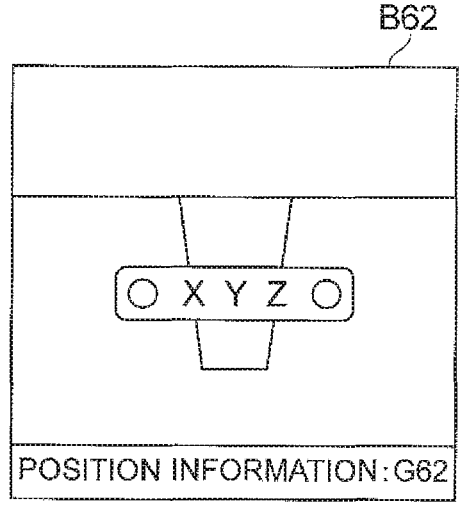
Figure 11:
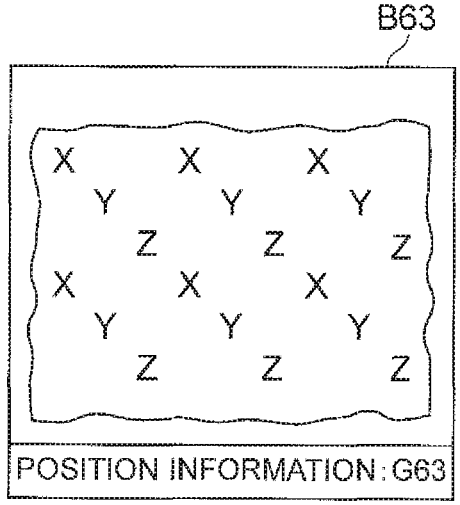

Another example of the evaluation of the reliability by the evaluation unit 14 is described hereinafter. The evaluation unit 14 may calculate the reliability based on a difference between a plurality of position information corresponding to the plurality of photographed images provided for one product. In this case, the request unit 12 requests a user to take, for one product, a plurality of photographed images with which position information indicating a place where a characteristic part is photographed. By requesting a user to take a plurality of photographed images, the more strict evaluation of the reliability is achieved. When making this request, the request unit 12 may present a plurality of designation information to a user. The image acquisition unit 13 acquires a plurality of photographed images transmitted from the user in response to the request. FIG. 11 is a view showing an example of a plurality of photographed images transmitted from the terminal device T for the evaluation of the reliability on one product. Each of those photographed images shows a characteristic part of a product and contains position information indicating a place where the characteristic part is photographed.

FIG. 11(*a*) shows a photographed image B61 showing a label. The photographed image B61 has position information G61. FIG. 11(*b*) shows a photographed image B62 showing a buckle. The photographed image B62 has position information G62. FIG. 11(*c*) shows a photographed image B63 showing a cloth. The photographed image B63 has position information G63.

In the case where there is a difference of a specified magnitude or more between the position information associated with the respective photographed images, the evaluation unit 14 evaluates the reliability to be lower than the case where a difference between the plurality of position information is less than a specified magnitude. In the case where the position information associated with each of a plurality of photographed images is different from each other, there is a possibility that at least any one of the acquired photographed images is not an image of a product for trade. In such a case, by evaluating the reliability of the product to be lower, it is possible to prevent that a product that is likely to be fake is registered as a product for trade.

Specifically, the evaluation unit 14 first calculates temporary reliability based on the similarly between the photographed images B61, B62 and B63 and the corresponding genuine images. The evaluation unit 14 compares the positions indicated by the photographed images B61, B62 and B63, and when there is a difference of a specified magnitude or more, outputs a value lower than the temporary reliability as the reliability of the product. The calculation of the reliability in this case may be made by subtracting a specified value from the temporary reliability or by multiplying the temporary reliability by a specified coefficient.

Another example of the evaluation of the reliability by the evaluation unit 14 is described hereinafter with reference to FIG. 12. In this example, in the case where the photographed image acquired by the image acquisition unit 13 is the same as the photographed image of another product acquired from the same user, the evaluation unit 14 evaluates the reliability to be lower than the case where they are not the same. Another product is a product of the same type as and is a different product from the product shown in the photographed image. When the photographed image acquired from a user as the photographed image of a product for trade is the same as the photographed image of another product acquired from the same user, there is a possibility that the photographed image is not an image of a product for trade. In such a case, the reliability of the product is evaluated to be lower, and it is thus possible to prevent that a product that is likely to be fake is registered as a product for trade.

Specifically, for those evaluations, photographed images that are acquired for the evaluation of the reliability by the evaluation unit 14 are stored in association with the product ID of each product in the product information storage unit 32. FIG. 12 is a view showing the configuration of the product information storage unit 32 storing photographed images and an example of data stored therein. As shown in FIG. 12, the product information storage unit 32 stores a price, a user ID, other attribute information, evaluated reliability and a photographed image in association with a product ID. When it is assumed that the image acquisition unit 13 acquires a photographed image B5 of a certain product (which is different from the products M1 to M4) from a user with the user ID "U04" for registration as a product for trade, the evaluation unit 14 first calculates temporary reliability based on the similarity between the photographed image B5 and the corresponding genuine image. The evaluation unit 14 compares the photographed image B5 with the photographed image B4 acquired in the past from the user with the user ID "U04", and when they are the same, outputs a value lower than the temporary reliability as the reliability of the product. The calculation of the reliability in this case may be made by subtracting a specified value from the temporary reliability or by multiplying the temporary reliability by a specified coefficient.

Figure 13:
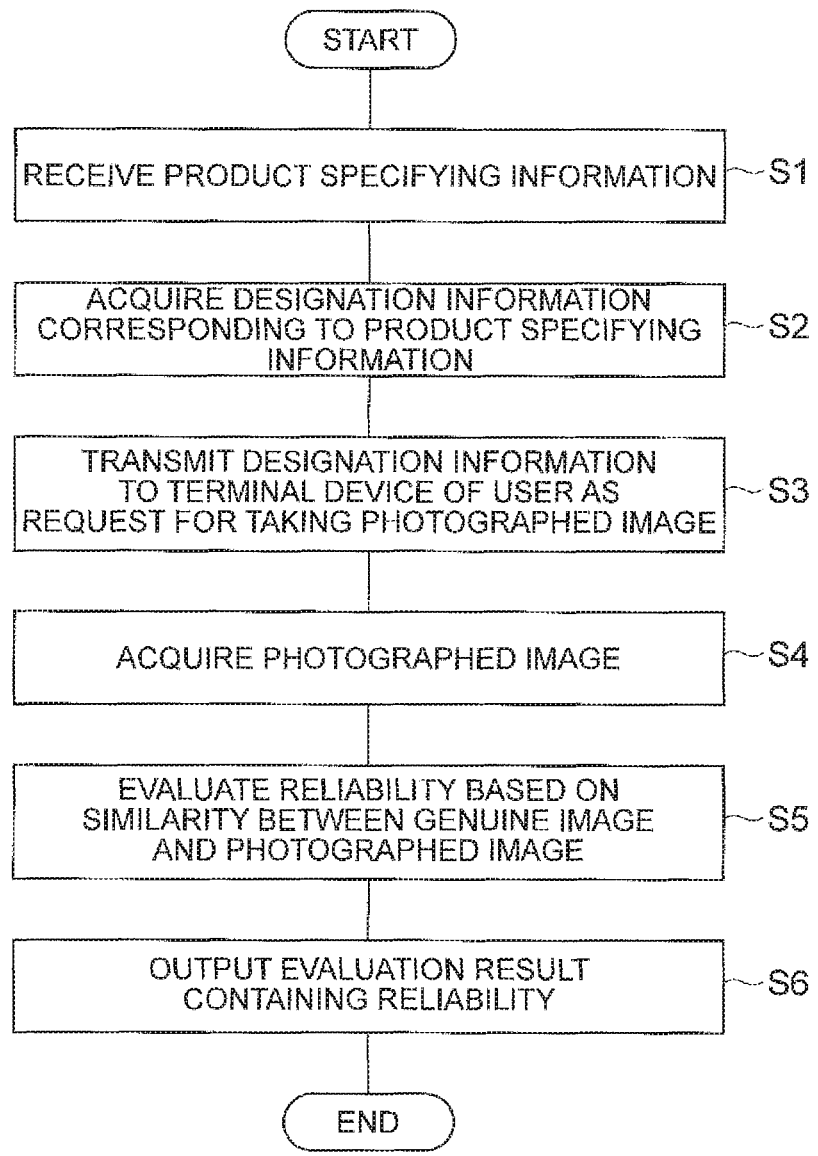
FIG. 13 is a flowchart showing an example of a process of a product evaluation method in a product evaluation device.

A product evaluation method according to this embodiment is described hereinafter with reference to FIG. 13. FIG. 13 is a flowchart showing an example of a process of a product evaluation method in the product evaluation device 1 shown in FIG. 2.

First, the receiving unit 11 receives the product specifying information of a product to be registered as a product for trade from the terminal device T of a user (S1). After receiving the product specifying information, the request unit 12 acquires the designation information that designates a characteristic part of the product specified by the product specifying information from the characteristic information storage unit 31 (S2). The request unit 12 then transmits the designation information acquired in Step S2 to the terminal device T of the user (S3). A request for taking a photographed image showing a characteristic part is thereby made to a user.

Then, the image acquisition unit 13 acquires the photographed image taken and transmitted from the terminal device T of the user in response to the request from the request unit 12 (S4). After acquiring the photographed image, the evaluation unit 14 calculates the reliability based on the similarity between a genuine image showing a characteristic part of a genuine product of the product specified by the product specifying information and the photographed image.

After that, the output unit 15 outputs an evaluation result containing the reliability evaluated in Step S5 (S6).

Figure 14:
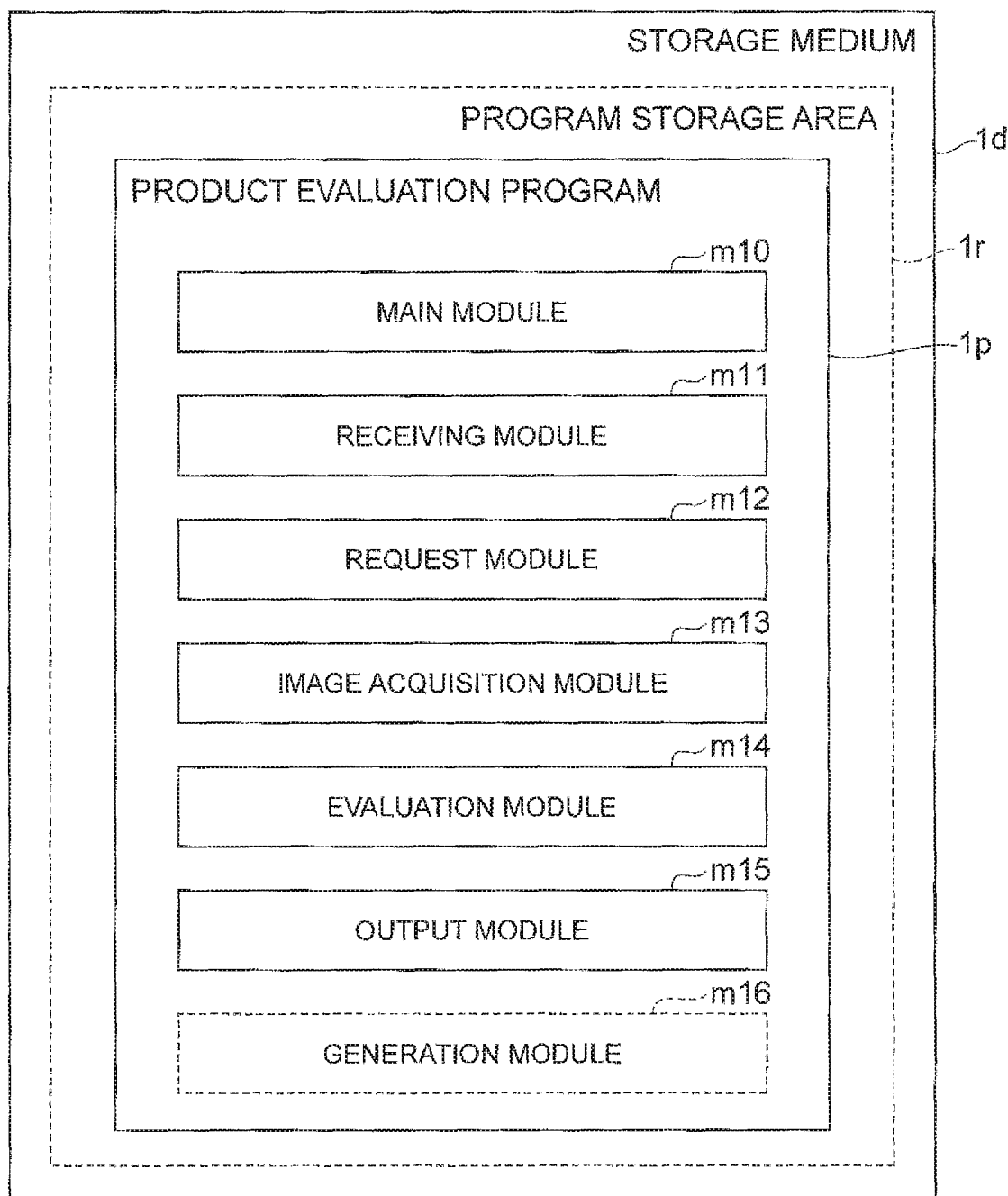
FIG. 14 is a view showing a structure of a product evaluation program.

A product evaluation program that causes a computer to function as the product evaluation device 1 is described hereinafter with reference to FIG. 14. A product evaluation program 1p includes a main module m10, a receiving module m11, a request module m12, an image acquisition module m13, an evaluation module m14, and an output module m15. The product evaluation program 1p may further include a generation module m16.

The main module m10 is a part that exercises control over the product evaluation processing. The functions implemented by executing the receiving module m11, the request module m12, the image acquisition module m13, the evaluation module m14, the output module m15 and the generation module m16 are respectively the same as the functions of the receiving unit 11, the request unit 12, the image acquisition unit 13, the evaluation unit 14, the output unit 15 and the generation unit 16 of the product evaluation device 1 shown in FIG. 2.

The product evaluation program 1p is provided through a storage medium 1d such as CD-ROM or DVD-ROM or semiconductor memory, for example. Further, the product evaluation program 1p may be provided as a computer data signal superimposed onto a carrier wave over a communication network.

According to the product evaluation device 1, the product evaluation method and the product evaluation program 1p of this embodiment described above, a request for taking a photograph of a characteristic part of a product is made to a user, and a photographed image that is taken by the user in response to the request is acquired. In other words, a request for acquiring an image of a characteristic part which allows discrimination between a genuine item and a fake item is made to a user. It is thereby possible to suppress the possibility that a fake item is registered as a product for trade.

An embodiment of the present invention is described in detail above. However, the present invention is not limited to the above-described embodiment. Various changes and modifications may be made to the present invention without departing from the scope of the invention.

Although a user of the terminal device T is a store on an electronic commerce site or a seller on an auction site in the above-described embodiment, it may be a user who has purchased a product on an electronic commerce site, an auction site or the like. In this case, the user can recognize the probability that the purchased product is a genuine product. To be specific, the following aspect can be implemented. The product evaluation device 1 displays a verify button to verify that a purchased product is a genuine product on a user's product purchase history screen. When the verify button is pressed, the product specifying information that specifies the corresponding product is received by the receiving unit 11, and the request unit 12 transmits and displays a guide image corresponding to the product specifying information on the terminal device of the user. The user takes a photograph of a characteristic part of the purchased product by using the terminal device on which the guide image is displayed and transmits the photographed image showing the characteristic part to the product evaluation device 1, the evaluation unit 14 calculates the reliability based on the similarity between a genuine image registered for the product by a seller and the photographed image. Then, the output unit 15 outputs an evaluation result containing the reliability to the terminal device of the user. The user can thereby obtain the reliability of the product which has been delivered to the user.

Further, the above-described aspect may be applied as a system for a user who is thinking about purchasing a product in a real store to obtain an evaluation result of the product. Specifically, a user who is thinking about purchasing a product sends a photographed image of a characteristic part of the product to the product evaluation device 1 in a store and can thereby obtain an evaluation result containing the reliability whether the product is a genuine product or not.

Further, although the product evaluation device 1 is included in an electronic commerce server that runs an electronic commerce site in the above-described embodiment, the product evaluation device 1 may be included in a terminal device that is used by a user. In this case, some or all of the functional units 11 to 16 shown in FIG. 2 are implemented in the terminal device. For example, all of the functional units 11 to 15 may be included in the terminal device, or the functional units 11 to 13 and 15 may be included in the terminal device and the evaluation unit 14 may be included in the server. In such a terminal device, when a user who is thinking about purchasing a product in a real store inputs the product specifying information of that product to the terminal device, the product specifying information is received by the receiving unit 11. Then, the request unit 12 presents the designation information corresponding to the input product specifying information and requests the user to take a photograph of a characteristic part of the product. When the user takes a photograph of the characteristic part of the product in response to the request, the image acquisition unit 113 acquires the photographed image showing the characteristic part. The evaluation unit 14 calculates the reliability based on the similarity between the acquired photographed image and a corresponding genuine image. Then, the output unit 15 presents the reliability to the user. Because the reliability is presented to the user in this manner, the user can recognize the probability that the product is a genuine product.

Further, the evaluation of the similarity between a photographed image and a genuine image may be done by a person. In this case, the evaluation unit 14 may display a photographed image and a genuine image next to each other on a display means to receive the input of an evaluation by a person.

Further, according to the above-described terminal device that includes some or all of the functional units 11 to 16, a user who has purchased a product transmits the product specifying information of the purchased product and transmits a. photographed image in response to a request from the request unit 12, the evaluation of the reliability of the photographed image is made and then the reliability is output to the user, and the user can thereby recognize the probability that the purchased product is a genuine product.

REFERENCE SIGNS LIST

1 . . . product evaluation device, 1d . . . storage medium, 1p . . . product evaluation program, 11 . . . receiving unit, 12 . . . request unit, 13 . . . image acquisition unit, 14 . . . evaluation unit, 15 . . . output unit, 16 . . . generation unit, 21 . . . product registration receiving unit, 22 . . . product information request receiving unit, 23 . . . product information output unit, 31 . . . characteristic information storage unit, 32 . . . product information storage unit, m10 . . . main module, m11 . . . receiving module, m12 . . . request module, m13 . . . image acquisition module, m14 . . . evaluation module, m15 . . . output module, m16 . . . generation module, T . . . terminal device

The invention claimed is:

1. A product evaluation device comprising:
at least one memory configured to store computer program code; and
at least one processor configured to access said at least one memory and operate as instructed by said computer program code, said computer program code comprising:
  receiving code configured to cause the at least one processor to receive first product specifying information for specifying a product attribute of a product from a first terminal;
  acquisition code configured to cause the at least one processor to, with respect to each of a plurality of characteristic parts of a genuine product, acquire designation information and a genuine image, corresponding to the product attribute specified by the first product specifying information, from a characteristic information storage that stores, for each product attribute, (i) a genuine image showing a characteristic part of the genuine product, (ii) product specifying information, and (iii) designation information designating the characteristic part in association with each other;
  generation code configured to cause the at least one processor to, with respect to each of the plurality of characteristic parts, extract, from the acquired genuine image, an outline of the characteristic part of the genuine product by detection of an edge and/or a corner in the genuine image, and generate a guide image based on the extracted outline, the guide image being an image schematically showing an outline of the characteristic part of the genuine product corresponding to the received first product specifying information, the guide image including text indicating to take a photograph of the characteristic part in accordance with the outline provided by the guide image;
  request code configured to cause the at least one processor to, with respect to each of the plurality of characteristic parts, transmit the guide image to the first terminal to be superimposed on an image of a viewfinder of the first terminal, and request the first terminal to transmit a photographed image of the product that is photographed according to the designation information acquired from the characteristic information storage and the outline indicated by the guide image and superimposed on the image of the viewfinder of the first terminal;
  image acquisition code configured to cause the at least one processor to acquire the photographed image of the product according to the request;
  evaluation code configured to cause the at least one processor to calculate reliability of the product based on a similarity between the photographed image of the product and the genuine image showing the characteristic part of the genuine product;
  output code configured to cause the at least one processor to output, to the first terminal, an evaluation result obtained based on the reliability;
  product registration receiving code configured to cause the at least one processor to register product information of products into a product information storage, wherein product information whose reliability is less than a first specified value is not registered in the product information storage; and
  product information output code configured to cause the at least one processor to receive a search request from a second terminal that specifies a search criteria, and output, to the second terminal, product information of a plurality of products comprising a first product and a second product that match the search criteria and are registered in the product information storage, in a manner such that product information of the first product with higher reliability is displayed with a higher display ranking than product information of the second product with lower reliability,
wherein the request code is further configured to cause the at least one processor to request the first terminal to transmit a plurality of photographed images for the product corresponding to the plurality of characteristic parts, and a plurality of pieces of position information indicating respective positions in which the plurality of photographed images are taken, and
wherein the evaluation code is further configured to cause the at least one processor to:
compare the plurality of pieces of position information of the plurality of photographed images to determine whether there is a specified magnitude or more of a difference between the positions in which the plurality of photographed images are taken;

based on the difference between any of the positions corresponding to the plurality of pieces of position information being the specified magnitude or more, calculate the reliability of the product as a first reliability value; and based on the difference between any of the positions corresponding to the plurality of pieces of position information being less than the specified magnitude, calculate the reliability of the product as a second reliability value, the first reliability value being lower than the second reliability value.

2. The product evaluation device according to claim 1, wherein
the product information output code is configured to cause the at least one processor to display on the second terminal the evaluation result along with the product information.

3. The product evaluation device according to claim 1, wherein
the evaluation code is configured to cause the at least one processor to calculate a similarity between the photographed image of the product and another genuine image stored in the characteristic information storage, and extract, as supplementary product information, second product specifying information associated with the another genuine image having a similarity of the first specified value or more to the photographed image by referring to the characteristic information storage, and
the output code causes the at least one processor to output the evaluation result containing the supplementary product information.

4. The product evaluation device according to claim 1, wherein
it is determined that the photographed image, currently acquired by the image acquisition code, is the same as a photographed image of another product previously acquired from the first terminal, and the evaluation code causes the at least one processor to calculate the reliability of the product to be lowered than in a case in which there is no photographed image of another product previously acquired from the first terminal that is the same as the photographed image currently acquired by the image acquisition code.

5. The product evaluation device according to claim 1, wherein
it is determined that a similarity between a region where the characteristic part of the product is shown in the photographed image and a region where the characteristic part is shown in the genuine image is a second specified value or higher, and the evaluation code causes the at least one processor to calculate the reliability further based on similarity between a region other than the region where the characteristic part of the product is shown in the photographed image and a region other than the region where the characteristic part is shown in the genuine image.

6. A product evaluation method to be executed by a computer, comprising:
receiving product specifying information for specifying a product attribute of a product from a first terminal;
with respect to each of a plurality of characteristic parts of a genuine product, acquiring designation information and a genuine image, corresponding to the product attribute specified by the product specifying information, from a characteristic information storage that stores, for each product attribute, (i) a genuine image showing a characteristic part of the genuine product, (ii) product specifying information, and (iii) designation information designating the characteristic part in association with each other;

with respect to each of the plurality of characteristic parts, extracting, from the acquired genuine image, an outline of the characteristic part of the genuine product by detection of an edge and/or a corner in the genuine image, and generating a guide image based on the extracted outline, the guide image being an image schematically showing an outline of the characteristic part of the genuine product corresponding to the received product specifying information, the guide image including text indicating to take a photograph of the characteristic part in accordance with the outline provided by the guide image;

with respect to each of the plurality of characteristic parts, transmitting the guide image to the first terminal to be superimposed on an image of a viewfinder of the first terminal, and requesting the first terminal to transmit a photographed image of the product that is photographed according to the designation information acquired from the characteristic information storage and the outline indicated by the guide image and superimposed on the image of the viewfinder of the first terminal;

acquiring the photographed image of the product according to the request;

calculating reliability of the product based on a similarity between the photographed image of the product and the genuine image showing the characteristic part of the genuine product;

outputting to the first terminal an evaluation result obtained based on the reliability;

registering product information of products into a product information storage, wherein product information whose reliability is less than a specified value is not registered in the product information storage; and receiving a search request from a second terminal that specifies a search criteria, and outputting to the second terminal product information of a plurality of products comprising a first product and a second product that match the search criteria and are registered in the product information storage, in a manner such that product information of the first product with higher reliability is displayed with a higher display ranking than product information of the second product with lower reliability, wherein the requesting the first terminal to transmit the photographed image of the product comprises requesting the first terminal to transmit a plurality of photographed images for the product corresponding to the plurality of characteristic parts, and a plurality of pieces of position information indicating respective positions in which the plurality of photographed images are taken, and, and wherein the calculating the reliability of the product comprises:

comparing the plurality of pieces of position information of the plurality of photographed images to determine whether there is a specified magnitude or more of a difference between the positions in which the plurality of photographed images are taken;

based on the difference between any of the positions corresponding to the plurality of pieces of position information being the specified magnitude or more, calculating the reliability of the product as a first reliability value; and based on the difference between any of the positions corresponding to the plurality of pieces of position information being less than the specified magnitude, calculating the reliability of the product as a second reliability value, the first reliability value being lower than the second reliability value.

7. A non-transitory computer-readable recording medium storing a product evaluation program that is executable by a computer to cause the computer to perform:

receiving product specifying information for specifying a product attribute of a product from a first terminal;

with respect to each of a plurality of characteristic parts of a genuine product, acquiring designation information and a genuine image, corresponding to the product attribute specified by the product specifying information, from a characteristic information storage that stores, for each product attribute, (i) a genuine image showing a characteristic part of the genuine product, (ii) product specifying information, (ii) product specifying information, and (iii) designation information designating the characteristic part in association with each other;

with respect to each of the plurality of characteristic parts, extracting, from the acquired genuine image, an outline of the characteristic part of the genuine product by detection of an edge and/or a corner in the genuine image, and generating a guide image based on the extracted outline, the guide image being an image schematically showing an outline of the characteristic part of the genuine product corresponding to the received product specifying information, the guide image including text indicating to take a photograph of the characteristic part in accordance with the outline provided by the guide image;

with respect to each of the plurality of characteristic parts, transmitting the guide image to the first terminal to be superimposed on an image of a viewfinder of the first terminal, and requesting the first terminal to transmit a photographed image of the product that is photographed according to the designation information acquired from the characteristic information storage and the outline indicated by the guide image and superimposed on the image of the viewfinder of the first terminal;

acquiring the photographed image of the product according to the request;

calculating reliability of the product based on a similarity between the photographed image of the product and the genuine image showing the characteristic part of the genuine product;

outputting to the first terminal an evaluation result obtained based on the reliability;

registering product information of products into a product information storage, wherein product information whose reliability is less than a specified value is not registered in the product information storage; and receiving a search request from a second terminal that specifies a search criteria, and outputting to the second terminal product information of a plurality of products comprising a first product and a second product that match the search criteria and are registered in the product information storage, in a manner such that product information of the first product with higher reliability is displayed with a higher display ranking than product information of the second product with lower reliability, wherein the requesting the first terminal to transmit the photographed image of the product comprises requesting the first terminal to transmit a plurality of photographed images for the product corresponding to the plurality of characteristic parts, and a plurality of pieces of position information indicating respective positions in which the plurality of photographed images are taken, and wherein the calculating the reliability of the product comprises:

comparing the plurality of pieces of position information of the plurality of photographed images to determine whether there is a specified magnitude or more of a difference between the positions in which the plurality of photographed images are taken;

based on the difference between any of the positions corresponding to the plurality of pieces of position information being the specified magnitude or more, calculating the reliability of the product as a first reliability value; and based on the difference between any of the positions corresponding to the plurality of pieces of position information being less than the specified magnitude, calculating the reliability of the product as a second reliability value, the first reliability value being lower than the second reliability value.

* * * * *